United States Patent
Davis et al.

(10) Patent No.: US 10,492,594 B2
(45) Date of Patent: Dec. 3, 2019

(54) ACTIVITY POWERED BAND DEVICE

(71) Applicant: Lenovo (Singapore) Pte. Ltd., Singapore (SG)

(72) Inventors: Mark Charles Davis, Durham, NC (US); Jennifer Greenwood Zawacki, Hillsborough, NC (US); Debra Kay Kobs-Fortner, Cary, NC (US); Douglas Warren Robinson, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/783,265

(22) Filed: Oct. 13, 2017

(65) Prior Publication Data

US 2018/0035793 A1   Feb. 8, 2018

Related U.S. Application Data

(62) Division of application No. 14/178,453, filed on Feb. 12, 2014, now Pat. No. 9,788,641.

(51) Int. Cl.
*H01L 41/113* (2006.01)
*A45F 5/02* (2006.01)
(Continued)

(52) U.S. Cl.
CPC .............. *A45F 5/02* (2013.01); *A41D 1/002* (2013.01); *A45F 2005/008* (2013.01); *H02N 2/18* (2013.01); *Y10T 29/49826* (2015.01)

(58) Field of Classification Search
CPC .. A45F 5/02; A41D 1/002; H02N 2/18; H01L 41/113
(Continued)

(56) References Cited

U.S. PATENT DOCUMENTS 6,198,204 B1 * 3/2001 Pottenger ............. A41C 3/0057
310/326
7,649,305 B2 * 1/2010 Priya ................... H01L 41/1136
310/339
(Continued)

FOREIGN PATENT DOCUMENTS

JP     2002-218769 A  *  8/2002  ............... H02N 2/00
JP     2010-16936 A   *  1/2010  ............... H02N 2/00
(Continued)

*Primary Examiner* — Thomas M Dougherty
(74) *Attorney, Agent, or Firm* — Ference & Associates LLC

(57) ABSTRACT

A method provides a band, including: placing an energy harvesting mechanism within a deformable band; the energy harvesting mechanism being placed to transform deformation of the deformable band into stored energy; and providing a connection element to the energy harvesting mechanism; said connection element offering a coupling of the stored energy of the deformable band to a device. In an embodiment, a force is applied to deform a deformable band along a length dimension of the deformable band. The force acts to move an energy harvesting mechanism of the deformable band such that the energy harvesting mechanism transforms deformation of the deformable band into stored energy. The stored energy may be used, e.g., to collect information using a sensor of said deformable band. Other aspects are described and claimed.

6 Claims, 4 Drawing Sheets

(51) Int. Cl.
*A41D 1/00* (2018.01)
*A45F 5/00* (2006.01)
*H02N 2/18* (2006.01)

(58) Field of Classification Search
USPC .......................................................... 310/339
See application file for complete search history.

(56) References Cited

U.S. PATENT DOCUMENTS

| | | | | |
|---|---|---|---|---|
| 8,227,956 | B2* | 7/2012 | Graumann | H02N 2/183 |
| | | | | 310/339 |
| 8,319,401 | B2* | 11/2012 | McKenna | A61B 5/0002 |
| | | | | 310/339 |
| 9,788,641 | B2* | 10/2017 | Davis | A45F 5/02 |
| 2013/0221761 | A1* | 8/2013 | DePaso | B65G 17/08 |
| | | | | 307/151 |
| 2015/0001993 | A1* | 1/2015 | Park | H01L 41/113 |
| | | | | 310/319 |
| 2015/0068069 | A1* | 3/2015 | Tran | H04B 1/385 |
| | | | | 36/136 |
| 2015/0162751 | A1* | 6/2015 | Leabman | A41B 1/08 |
| | | | | 219/211 |
| 2015/0287904 | A1* | 10/2015 | White | H01L 41/113 |
| | | | | 310/319 |
| 2015/0333572 | A1* | 11/2015 | Leabman | A41D 1/002 |
| | | | | 320/108 |
| 2016/0023245 | A1* | 1/2016 | Zadesky | A61B 5/7455 |
| | | | | 310/334 |
| 2016/0094079 | A1* | 3/2016 | Hiroki | H02J 7/025 |
| | | | | 320/101 |
| 2017/0164878 | A1* | 6/2017 | Connor | G09B 23/28 |
| 2018/0042513 | A1* | 2/2018 | Connor | A61B 5/6831 |
| 2019/0000332 | A1* | 1/2019 | Li | A61B 5/02438 |

FOREIGN PATENT DOCUMENTS

| | | | | |
|---|---|---|---|---|
| JP | 2010-16974 A | * | 1/2010 | ............ H02N 2/00 |
| KR | 100930274 B1 | * | 12/2009 | ............ A61N 1/36 |

* cited by examiner

ACTIVITY POWERED BAND DEVICE

CROSS-REFERENCE TO RELATED APPLICATION

This application is a divisional application of co-pending U.S. patent application Ser. No. 14/178,453, filed Feb. 12, 2014, the contents of which are hereby incorporated by reference as if set forth in their entirety.

BACKGROUND

Information handling devices ("devices"), for example smart phones, tablet computers, etc., have seen their functionality replicated and enhanced in the form of wearable devices. For example, smart watches are a form factor gaining in popularity, with many smart phone or tablet functions being provided or enhanced via the smart watch (e.g., messaging application such as SMS text, email, image capturing with a camera, etc.).

Therefore, users may include wearable devices among their personal electronics to provide a fuller user experience. Wearable devices are often compatible such that they operate in connection with other, more conventional devices, e.g., tablet computing devices, laptop and desktop computing devices, smart phones, etc. In this regard, information may be exchanged between the various devices via wired and/or wireless connections there-between.

BRIEF SUMMARY

In summary, one aspect provides a band, comprising: an energy harvesting mechanism that stores energy in response to deformation of the band; a device; and a connection coupling the stored energy of the band to the device.

Another aspect provides a method, comprising: placing an energy harvesting mechanism within a deformable band; the energy harvesting mechanism being placed to transform deformation of the deformable band into stored energy; and coupling a connection element to the energy harvesting mechanism, said connection element offering a coupling of the stored energy of the deformable band to a device.

Another aspect provides a method, comprising: applying a force to deform a deformable band along a length dimension of the deformable band; said force acting to move an energy harvesting mechanism of the deformable band such that the energy harvesting mechanism transforms deformation of the deformable band into stored energy; and collecting information using a sensor of said deformable band; said sensor acting to use the stored energy of the deformable band to collect said information.

A further aspect provides a system, comprising: a band including an energy harvesting mechanism that stores energy in response to deformation of the band; a remote device; and a connection coupling the stored energy of the band to the remote device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims

DETAILED DESCRIPTION

Figure 1:
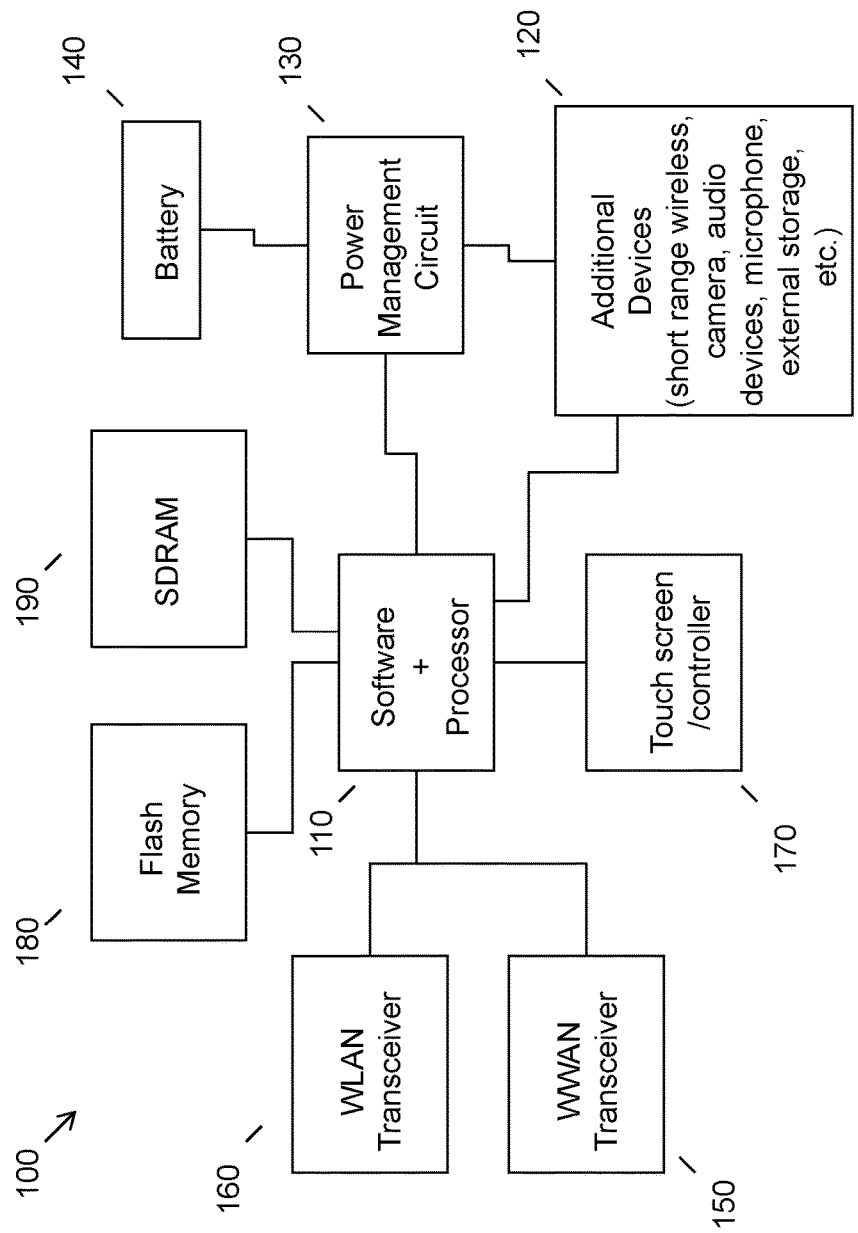
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

A benefit of wearable devices, e.g., a smart watch or other wearable device, is that modern sensors can be much more effective if they are physically separated. For example, a remote microphone could be used to improve quality or listen to different sounds as compared to a microphone on a single device. Similarly, a remote camera would have a different point of view than a camera integrated within, e.g., a laptop or tablet computing device.

A problem, however, is that the remote sensors require a ready power source. Thus, each of these remote sensing devices requires not only an additional device but one that must be provided power all the time. In this regard, although a smart watch solves the location problem, i.e., provides remote sensing capability with respect to another device with which it communicates, e.g., a tablet computing device or smart phone, and may be complex enough to even replace an existing device, it does not solve the power problem. That is, a smart watch includes a battery that is charged in a conventional fashion, e.g., via wired charging or via wireless charging (via a charging pad). Each of these charging schemes, at present, requires the smart watch to be removed for frequent charging. Similarly, portable/wearable health monitors allow appropriate sensing but only have about one week of stored battery charge before a need to be charged arises. This creates a significant tradeoff between device functionality (and power draw) and device independence (i.e., the ability to operate without going through a dedicated charging period).

Accordingly, an embodiment provides a wearable device that is charged via the activity of the user. In an embodiment, a wearable band device, e.g., incorporated into a belt buckle, provides a device that can be augmented with sensors and a solution to the power supply problem is thus afforded. Moreover, as many people already wear a belt, a conventional belt buckle may be easily replaced with one formed according to an embodiment.

In an embodiment, an activity powered band device such as a smart belt buckle leverages the natural stresses on the belt buckle, which involve a considerable force that may be utilized as a power source, to provide energy to the device's functional components, e.g., sensors, communication elements, display screen, and the like. Forces of up to 20 lbs and motion on the order of inches frequently occur, e.g., one time per minute. This represents approximately 50 milliwatts of energy and is adequate to power a typical microcontroller, sensors and wireless network communication device.

An embodiment thus utilizes a method to convert the mechanical energy from deformation (e.g., along a linear dimension of a band such as a belt) into electricity usable by the device components. A rechargeable battery may be incorporated into the system to capture and store the energy to provide a consistent user experience. Wireless communication may be afforded using, e.g., a low energy BLUETOOTH communication element in operative connection with another device, e.g., a smart phone.

In an embodiment, a wearable device incorporating a deformable band, e.g., a smart belt buckle, may use input for control, e.g., voice activation, buttons, or touch screen. The device may also incorporate a low energy display. In some embodiments, the primary method to interact with the device is another, operatively coupled device, e.g., a smart phone application sending commands and receiving information from the wearable device.

Sensor(s) of the wearable device may include a microphone to provide alternate sound input, physiological sensors (e.g., pulse, step counting, sound detection, etc.) for health monitoring, e.g., to report activity levels, abdominal sounds or the like. Also, a sensor or sensors may provide positional or orientation information, e.g., using standard 9-axis motion detectors (including an accelerometer, gyroscope and compass).

Given the implementation chosen, unique sensor inputs may be available. For example, if in the form of a belt, since the belt is worn for long periods and is near the center of mass, position reading from the buckle would be different than from other locations such as a watch or phone in a pocket. Other remote sensors (temperature, light, humidity, etc.) may be utilized, e.g., may be placed in the buckle.

The data or information derived from sensor(s) of the buckle may be combined of fused with other data or information to do sophisticated physical or medical analyses. For example, unique audio data could be combined with other physical data to determine types of physical stress and allow recommended actions to be identified. The power draw for such complex calculations may remain low, for example by having an operatively coupled device such as a tablet computing device or smart phone handle some or all of the processing needed.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system design found for example in tablet or other mobile computing platforms. Software and processor(s) are combined in a single unit 110. Internal busses and the like depend on different vendors, but essentially all the peripheral devices (120) may attach to a single unit 110. The circuitry 100 combines the processor, memory control, and I/O controller hub all into a single unit 110. Also, systems 100 of this type do not typically use SATA or PCI or LPC. Common interfaces for example include SDIO and I2C.

There are power management circuits(s) 130, e.g., a battery management unit, BMU, which manage power as supplied for example via a rechargeable battery 140, which may be recharged by a connection to a power source (not shown). In at least one design, a single unit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, one of the additional devices 120 is commonly a sensor such as a microphone, a camera, a positional sensor, etc. Commonly, system 100 will include a touch screen/controller 170 for data input and display. System 100 also typically includes various memory devices, for example flash memory 180 and SDRAM 190.

Figure 2:
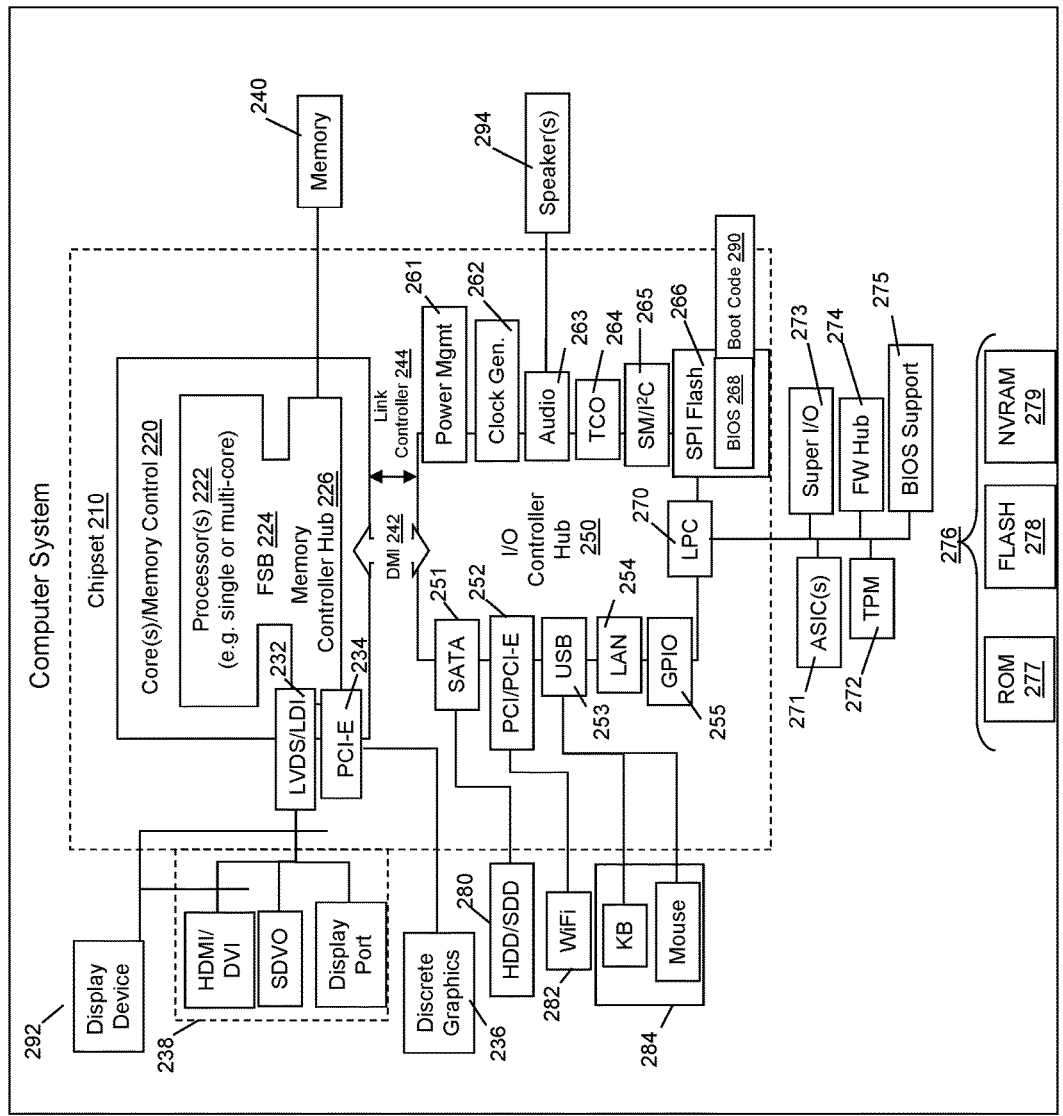
FIG. 2 illustrates another example of an information handling device.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a set 210 (a group of integrated circuits, or chips, that work together) with an architecture that may vary depending on manufacturer (for example, INTEL, AMD, ARM, etc.). INTEL is a registered trademark of Intel Corporation in the United States and other jurisdictions. AMD is a registered trademark of Advanced Micro Devices, Inc. in the United States and other jurisdictions. ARM is a trademark of ARM Holdings plc in various jurisdictions.

The architecture of the set 210 includes a core and memory control group 220 and an I/O controller hub 250 that exchanges information (for example, data, signals, commands, et cetera) via a direct management interface (DMI) 242 or a link controller 244. In FIG. 2, the DMI 242 is an interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a unit that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280, etc.), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as wearable devices. For example, the circuitry outlined above, e.g., in FIG. 1, may be incorporated into a wearable device such as a belt including a band component, e.g., belt buckle, which is charged via user activity. Of course, some of the circuitry outlined in FIG. 1 may or may not be included. Similarly, the circuitry outlined in FIG. 2 may be included in a device with which a wearable device communicates and operates with, e.g., a user's laptop computer.

Figure 3:
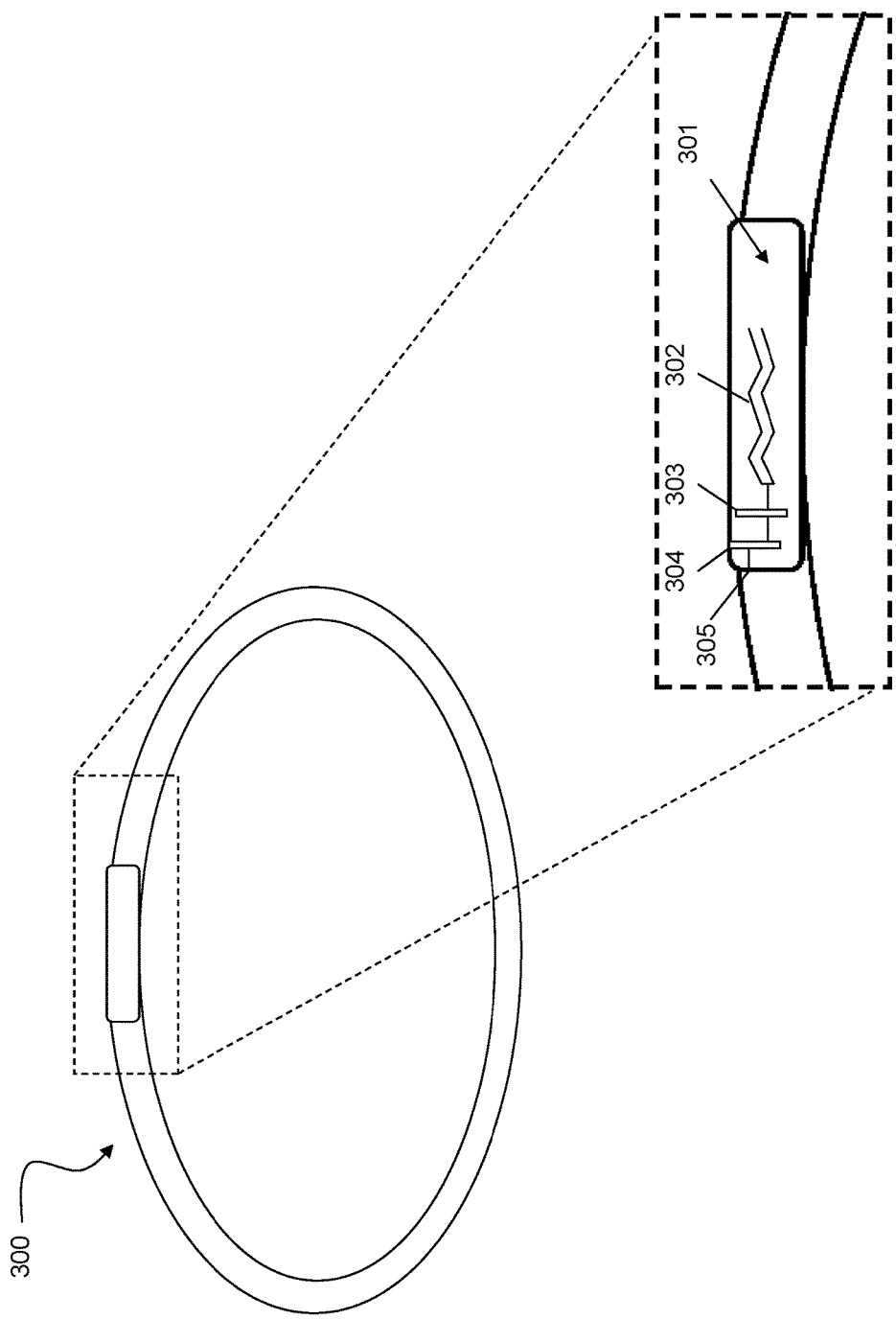
FIG. 3 illustrates an example of an activity powered band device.

Referring to FIG. 3, an embodiment provides a band 300 that includes a mechanism 302 that harvests the energy provided by user activity, e.g., incorporated into the band as a component such as a belt buckle 301. It should be noted that "activity" may be understood as physical movement imparting deforming force to the band, whether intentional or inadvertent. For example, a user's natural motions throughout the day may translate to force applied to a band such as a belt worn about the waist. In this regard, a user often provides activity in a passive manner.

Thus, in an embodiment, an energy harvesting mechanism 302 stores energy in response to deformation of the band 300. This deformation may be a stretching and relaxing of a pliable or flexible material included in the band 300. For example, the band, if formed as a belt with a belt buckle 301, may include flexible material in the band proper or in a component thereof, e.g., within the belt buckle 301, such that the user activity flexes and relaxes the band in a linear dimension, e.g., as the user breathes in and out, expands and contracts the abdominal area, etc.

The energy harvesting mechanism 302 may take a variety of forms and indeed more than one form may be incorporated into a single band component, e.g., buckle 301, or several components. In this regard, the energy harvesting mechanism 302 will be acceptable if it converts physical movement of the deformable band (or sub component thereof, e.g., buckle 301) into stored energy. Acceptable energy harvesting mechanisms 302 include but are not limited to piezo-electric materials that accumulate electric charge in response to mechanical stress, linear generators, radial generators and the like.

A connection element 305 may provide a connection between the energy harvesting mechanism 302 and a device, e.g., a sensor, a display screen, a memory device, and/or an external device such as a smart phone, tablet computing device, etc. The connection element 305 may include a plurality of connection elements, for example linking an energy storage component 303 such as a rechargeable battery and a sensor 304, e.g., a camera, a microphone, a physiological sensor, etc. It should be noted that the device 303, e.g., a sensor such as a camera, may be physically separate from the buckle 301, and thus the connection element may include a wired or wireless connection therebetween. Thus, the connection element may operatively couple various sub components such that the energy harvesting mechanism 302 may charge a battery 303, e.g., via diode (or similar electronic circuitry to limit current and power flow to charging the battery) placed in connection with the energy harvesting mechanism 302 and the battery 303, and provide power for operation of a sensor 304 or sensors that in turn communicate with a connected device such as a paired smart phone, tablet, etc.

In an embodiment, a system may be formed including a band having an energy harvesting mechanism 302 that stores energy in response to deformation of the band, and a remote device similar to device 304, placed remotely (e.g., off the band in another wearable article), with a connection coupling the stored energy of the band, e.g., stored in a battery such as 303, to the remote device, e.g., another wearable device such as a smart watch or the like. The connection may provide energy of the band to the other, remote device, e.g., using a wired or wireless connection. In an embodiment, the remote device may be temporarily connected to the band, e.g., for charging using stored energy of the band.

In an embodiment, an energy harvesting mechanism 302 is placed within a deformable band 300, e.g., within a buckle 301 of a belt to transform deformation of the deformable band element, e.g., buckle 301 in the example of FIG. 3, into stored energy, e.g., stored in rechargeable battery 303. A coupling, e.g., facilitated by a connection element such as indicated at 305, may be provided such that the energy harvesting mechanism 302 is coupled to a device 304, such as a camera, microphone, a low powered display or a component of the connection element, e.g., a wireless radio such as a BLUETOOTH communication element.

The connection element 305 offers a coupling of the deformable band 300 to a device such as a smart phone or a tablet computing device, e.g., via a wired or wireless connection. The coupled device, e.g., smart phone or tablet computing device, may thus communicate with the device 304 of the band 300, e.g., camera, low power display, etc., via a wired or wireless communication protocol such that additional functionality may be facilitated by the connected device.

The device 304 of the band 300 may be one or more devices, such as a sensor selected from the group consisting of a camera, a position sensor, an orientation sensor, an audio sensor, and physiological sensor; and/or the device may be a low power display, a memory device, or a suitable combination of the foregoing. The band 300 may be, in addition to or in lieu of a belt, integrated into an article of clothing for a user. For example, the band 300 may be integrated into a waistband of an article of clothing or otherwise integrated into a wearable band shaped device that flexes with movement of the user.

In an embodiment, the activity of a user is leveraged to supply force that deforms a band (or portion thereof) to allow physical movement to be converted into stored electrical energy. For example, if the band is formed of a material having a length dimension that exceeds a width dimension and a depth dimension, e.g., a belt that is longer than it is wide or deep, the deformation of the band may include a linear deformation that is substantially parallel to the length dimension of the band, e.g., stretching and compressing of the belt circumferentially. In this regard, the band may include suspenders, or a band included in a shoe, a bra-strap or other wearable article.

Figure 4:
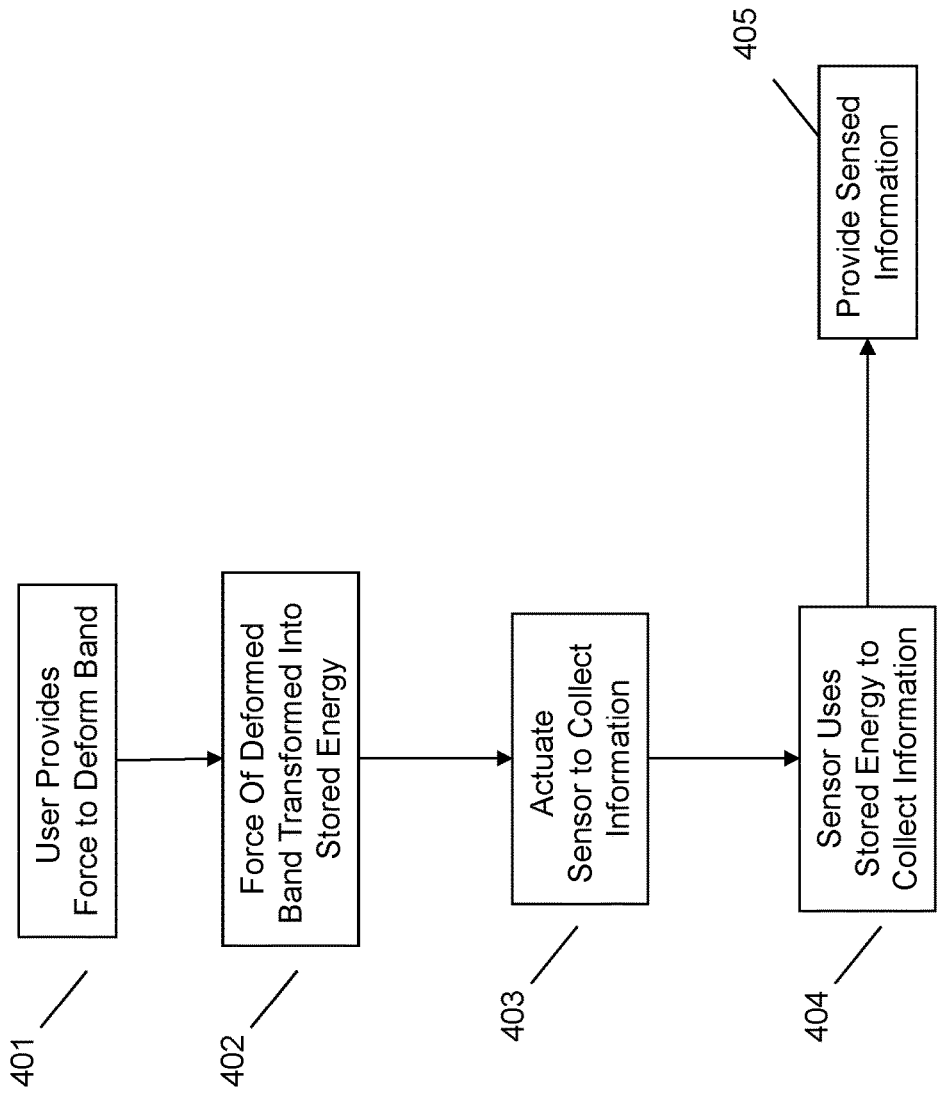
FIG. 4 illustrates an example method of operating an activity powered band device.

Turning to FIG. 4, by way of example, a user applies a force to deform a deformable band along a length dimension of the deformable band at 401. For example, a user wearing the belt will stretch and relax the belt, and thus the band component containing the energy harvesting mechanism, thus providing deformation thereof. The force acts to move the energy harvesting mechanism of the deformable band such that the energy harvesting mechanism transforms deformation of the deformable band into stored energy at 402. An embodiment, as described herein, includes a sensor such as a camera, microphone of physiological/medical sensor, that collects information, e.g., as actuated by a user or otherwise, e.g., according to a policy, as illustrated at 403.

The sensor acts to use the stored energy of the deformable band to collect the information at 404 and may thereafter provide the information so collected, e.g., via a connection element such as a wired or wireless communication connection to an operatively coupled device such as a smart phone or tablet computing device. For example, the sensed information may be transmitted to another device for storage and/or processing.

Accordingly, an embodiment provides an activity powered band device. The device transforms the user's deformation (e.g., stretching) of the band (or component thereof) into electrical energy that powers, e.g., a sensor, a low powered display, a communication element, etc. In this way, an embodiment leverages existing physical force in a way that permits a remotely located sensor to derive its power in an efficient and non-intrusive way. This in turn facilitates use of remotely located sensors, e.g., in connection with other devices such as smart phones, tablets, laptops, etc.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   storing, using an energy harvesting mechanism positioned within a deformable band, energy in response to deformation of the deformable band; and
   collecting, using a device of the deformable band, information associated with a wearer of the deformable band;
   wherein a connection element provides a coupling of the stored energy of the deformable band to the device.

2. The method of claim 1, wherein the deformable band further comprises a communication element.

3. The method of claim 1, wherein the device is selected from the group consisting of a camera, a position sensor, an orientation sensor, an audio sensor, and a physiological sensor.

4. The method of claim 1, wherein the energy harvesting mechanism is selected from the group consisting of a piezo-electric mechanism, a linear generator mechanism, and a radial generator mechanism.

5. The method of claim 1, wherein the deformable band is integrated within an article of clothing.

6. The method of claim 5, wherein the article of clothing is a belt.

* * * * *